(12) United States Patent
Vial

(10) Patent No.: US 12,454,003 B2
(45) Date of Patent: Oct. 28, 2025

(54) LASER MELTING ADDITIVE MANUFACTURING EQUIPMENT WITH ANTI-TURBULENCE SHIELDS

(71) Applicant: SAFRAN AIRCRAFT ENGINES, Paris (FR)

(72) Inventor: Matthieu Vial, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 764 days.

(21) Appl. No.: 17/638,392

(22) PCT Filed: Aug. 26, 2020

(86) PCT No.: PCT/FR2020/051503
§ 371 (c)(1),
(2) Date: Feb. 25, 2022

(87) PCT Pub. No.: WO2021/038170
PCT Pub. Date: Mar. 4, 2021

(65) Prior Publication Data
US 2022/0297189 A1   Sep. 22, 2022

(30) Foreign Application Priority Data
Aug. 28, 2019 (FR) ...................................... 1909471

(51) Int. Cl.
*B29C 64/371* (2017.01)
*B22F 10/00* (2021.01)
(Continued)

(52) U.S. Cl.
CPC .............. *B22F 10/28* (2021.01); *B22F 10/00* (2021.01); *B22F 10/73* (2021.01); *B22F 12/224* (2021.01); *B22F 12/41* (2021.01); *B22F 12/67* (2021.01); *B33Y 10/00* (2014.12); *B22F 12/47* (2021.01); *B22F 12/70* (2021.01); *B22F 2201/10* (2013.01); *B22F 2998/10* (2013.01); *B33Y 30/00* (2014.12)

(58) Field of Classification Search
None
See application file for complete search history.

(56) References Cited

U.S. PATENT DOCUMENTS

2016/0214173 A1   7/2016   Fisser
2019/0039307 A1   2/2019   Hofmann et al.
2019/0047085 A1   2/2019   Liebl et al.

FOREIGN PATENT DOCUMENTS

CN          201300207 Y  *  9/2009
DE     102010052206 A1  *  5/2012   ............ B22F 3/1055
(Continued)

OTHER PUBLICATIONS

CN201300207Y] (machine translation) (Year: 2013).*
Written Opinion of the International Searching Authority mailed Oct. 30, 2020, issued in the corresponding International Application No. PCT/FR2020/051503, filed Aug. 26, 2020, 10 pages.
(Continued)

*Primary Examiner* — Yung-Sheng M Tsui
(74) *Attorney, Agent, or Firm* — Christensen O'Connor Johnson Kindness PLLC

(57) ABSTRACT

Additive manufacturing equipment includes a laser head intended to emit a laser beam defining a longitudinal axis, a first, a second, and a third container respectively aligned in a first transverse plane substantially perpendicular to the longitudinal axis, the three containers each including a movable plate that can move along the longitudinal axis, each plate being intended to receive a thickness of powder of which the free ends define three powder beds aligned in a second transverse plane, the equipment additionally including a movable scraper intended to move in a third plane transverse with respect to the surface of the containers so as to be in contact with each of the powder beds. The equipment includes a first and a second movable shield that are intended to move in the same third transverse plane as the movable scraper.

6 Claims, 3 Drawing Sheets

(51) Int. Cl.
   *B22F 10/28*  (2021.01)
   *B22F 10/73*  (2021.01)
   *B22F 12/00*  (2021.01)
   *B22F 12/41*  (2021.01)
   *B22F 12/67*  (2021.01)
   *B33Y 10/00*  (2015.01)
   *B22F 12/47*  (2021.01)
   *B22F 12/70*  (2021.01)
   *B33Y 30/00*  (2015.01)

(56) References Cited

FOREIGN PATENT DOCUMENTS

DE   102017221909 A1   6/2019
WO       9308928 A1   5/1993

OTHER PUBLICATIONS

International Preliminary Report on Patentability mailed Mar. 1, 2022, issued in the corresponding International Application No. PCT/FR2020/051503, filed on Aug. 26, 2020, 1 page.
English Translation of the International Search Report mailed on Oct. 30, 2020, issued in the corresponding International Application No. PCT/FR2020/051503, filed on Aug. 26, 2020, 3 pages.
English Translation of the Written Opinion of the International Searching Authority mailed on Oct. 30, 2020, issued in the corresponding International Application No. PCT/FR2020/051503, filed on Aug. 26, 2020, 4 pages.

* cited by examiner

LASER MELTING ADDITIVE MANUFACTURING EQUIPMENT WITH ANTI-TURBULENCE SHIELDS

CROSS-REFERENCES TO RELATED APPLICATIONS

This application is a National Stage of International Application No. PCT/FR2020/051503, filed Aug. 26, 2020, which claims priority to French Patent Application No. 1909471, filed Aug. 28, 2019, the entire disclosures of which are hereby incorporated by reference.

TECHNICAL FIELD

Embodiments of the present disclosure relate to additive manufacturing methods by laser melting, in particular in the aeronautical field.

BACKGROUND

The additive manufacturing is defined as the method for shaping a part by adding material, as opposed to the traditional shaping which proceeds by removing material (machining).

The additive manufacturing has many advantages, including the ability to manufacture very complex shapes, some of which cannot be achieved with the conventional methods, and with a wide variety of materials. This also allows the production of monobloc parts, i.e. parts without assembly. The manufacturing times are also interesting for serial production of parts because no equipment is required. Depending on the parts, the additive manufacturing can allow for a significant reduction in manufacturing costs and a simplification of the overall process (e.g. no need for certain heat treatments, no multiple turning and/or milling operations).

More precisely, the laser melting additive manufacturing is a method which consists in aggregating by selective melting, in an enclosure under neutral gas, the particles of a powder bed (see FIGS. 1 and 2).

This powder bed is placed on a construction platform. The melting is done by means of a laser beam which scans the surface of the powder bed and melts the powder on a section determined (by a preliminary modelling, for example), referred to as melting area. After the molten part of the powder bed has solidified, the building platform is lowered to spread a new layer of powder of a predetermined thickness. The laser scans the surface of the powder again to create an additional section superimposed on the previous layer. The three-dimensional (3D) part is a sort of stacking of two-dimensional (2D) flat strata. In other words, we can say that the laser melting method consists in melting a layer of powder by means of a laser beam on a given surface and vertically incrementing the position of the platform to obtain a 3D shape.

The laser melting manufacturing of parts is thus carried out with an equipment 10 forming a specific machine comprising, in particular, three powder containers 12, 14, 16 (one for the powder supply, one for the melting and one for the surplus), a laser head 18, a movable scraper 20 and an argon projection system 22 comprising at least one gas flow grid of the projection system 22 (see FIG. 2).

The laser sources present in the melting machines are classically of the Nd:YAG fibered type with a wavelength of 1064 nm, with powers ranging from 50 to 1000 W, and used in continuous mode.

The acronym Nd:YAG comes from the English name: neodymium-doped yttrium aluminum garnet (Nd:Y3Al5O12) is a crystal used as an amplifying medium for the lasers using solid media.

The beams are generally of Gaussian type or, recently, uniform on some 1000 W lasers. On some equipment, it is possible to find up to four laser sources working simultaneously.

The manufacture is carried out under controlled atmosphere of argon (Ar) or dinitrogen (N2). The choice of the shielding gas is defined by the type of material used. The purity of the gas, as well as the tightness of the manufacturing enclosure, play an important role in the melting method. Often the temperature of the enclosure can be a major factor in the manufacturing, as it can lead to steaming the powder or stress relaxation.

To protect the melting as well as the melting bath, a laminar flow of argon (Ar) is also projected in order to eliminate the particles that could redeposit on the freshly melted portion, and to plate the powder at the time of the melting.

Nevertheless, this projection generates turbulences in some areas of the cavity which induce metallurgical defects on the portions located at the edge of the laser melting tank.

SUMMARY

To overcome this disadvantage, the disclosure proposes a laser melting additive manufacturing equipment, the equipment comprising a laser head intended to emit a laser beam defining a longitudinal axis, a first, a second and a third container respectively aligned in a first transverse plane substantially perpendicular to the longitudinal axis, the second container being located between the first container and the third container, the three containers each comprising a movable platform that can move along the longitudinal axis, each platform being intended to receive a thickness of powder, the free ends of which define three powder beds aligned in a second transverse plane, the equipment further comprising a movable scraper intended to move in a third plane transverse with respect to the surface of the containers so as to be in contact with each of the powder beds.

The equipment is characterised in that it comprises a first and a second movable shields that are intended to move in the same third transverse plane as the movable scraper between:
- a melting position in which the first shield is located between the first container and the second container and the second shield is located between the second container and the third container,
- a reloading position in which the first and second shields are located at a transverse end of the set of the three containers.

This reduces the turbulences in the vicinity of the impact area and limits the metallurgical defects. A homogeneous melting is obtained on the whole equipment.

The equipment according to the disclosure may comprise one or more of the following characteristics and/or steps, considered alone or in combination with each other:
- the first container is a powder supply, the second container is a laser melting tank and the third container is a powder surplus container,
- in the melting position, the movable scraper surmounts the first container, and in the reloading position, the movable scraper is located at the transverse end of the set of the three containers, the same as the first and second shields, the laser beam is intended to be emitted in the direction of the powder bed of the second container so as to create an impact area for the laser beam on the powder bed, the first and second shields being located, in the melting position, transversely on either side of the impact area, in the direct vicinity of the impact area, during a given melting phase, the laser head is movable, and the first and second shields move in correlation with the laser head, the equipment comprises an inert gas projection system comprising at least one gas flow grid and in that the first and second shields comprise movable walls having a depth as measured along an axis perpendicular to the longitudinal axis and parallel to the second plane, at least equal to that of the second container and a height along the axis at least equal to that of the at least one gas flow grid.

The disclosure also has as its object a laser melting additive manufacturing method implemented by means of the equipment described above, wherein a part is manufactured by a succession of melting phases and reloading phases:

during each melting phase, the laser head is activated and the laser beam impacts the powder bed of the second container creating an impact area in which the powder is melted;

during each reloading phase, the platforms of the containers move one step along the longitudinal axis away from or towards the laser head, the first and second shields move from their melting position to their reloading position, the movable scraper moves from its melting position to its reloading position so as to wipe the non-melted powder from the powder bed of the second container and then returns to its melting position, and the first and second shields return to their melting position.

The method can comprise a phase of filling the first container preceding the cycle of successive melting and reloading phases, and a phase of removing the part follows the cycle of successive melting and reloading.

DESCRIPTION OF THE DRAWINGS

Further characteristics and advantages of the disclosure will become apparent from the following detailed description, for the understanding of which reference is made to the attached drawings in which.

DETAILED DESCRIPTION

Figure 1:
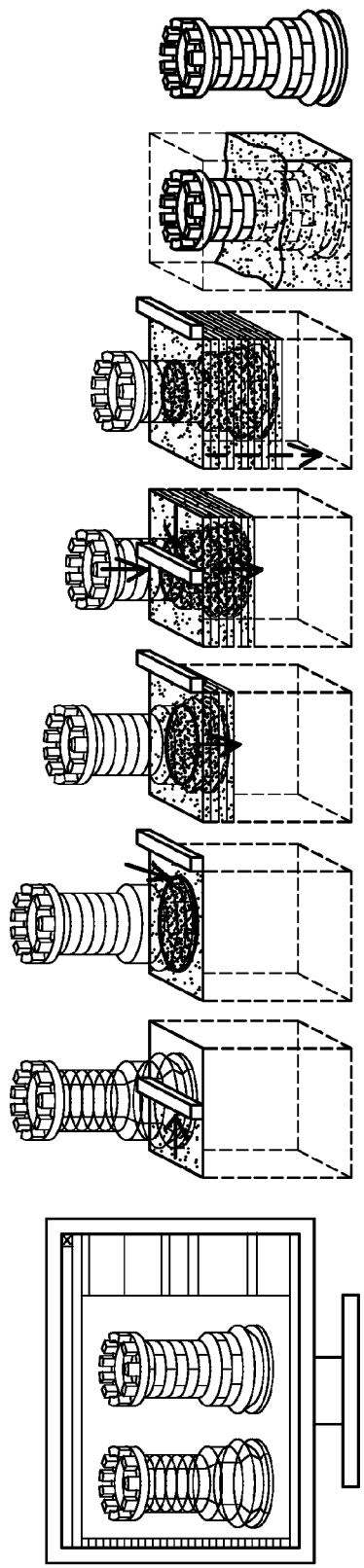
FIG. 1 is a diagram of the different steps of the laser melting additive manufacturing of any part.

As already described in the introduction and well known in the prior art, a laser melting additive manufacturing equipment 10 operates along a longitudinal axis X, parallel to the axis of the laser beam L used. Indeed, the part to be manufactured is produced step by step along this axis X and the equipment 10 comprises various movable portions moving along this axis X or in various planes perpendicular to it.

The equipment 10 classically comprises, within a sealed tank intended to receive an inert gas such as argon (Ar) or dinitrogen ($N_2$), three powder containers 12, 14, 16 aligned in a plane substantially perpendicular to the longitudinal axis X. They are thus aligned in a first transverse plane. Each container (12, 14, 16) has a free surface facing a laser head 18. The first container 12 is a container intended to receive a supply of powder, the second container 14 is intended to form a melting tank, and the third container 16 is intended to receive any surplus of powder. The second container 14 is located between the first container 12 and the third container 16.

The inert gas is injected into the sealed tank by means of the gas flow grids of the projection system 22. These grids typically have a rectangular shape with a length perpendicular to the axis X much greater than the height, parallel to the axis X.

Each container (12, 14, 16) is therefore intended to receive a thickness of powder whose free surface forms three powder beds aligned on a second transverse plane. This second transverse plane is located on the longitudinal axis X, between the laser head 18 and the first transverse plane.

The melting tank is the portion of the equipment 10 in which the manufacturing of the part as such takes place: it is on the powder bed of this second container 14 that the laser beam L, when the laser head 18 is activated, impacts the powder and melts it, in order to create, layer by layer, the part to be manufactured.

Figure 2:
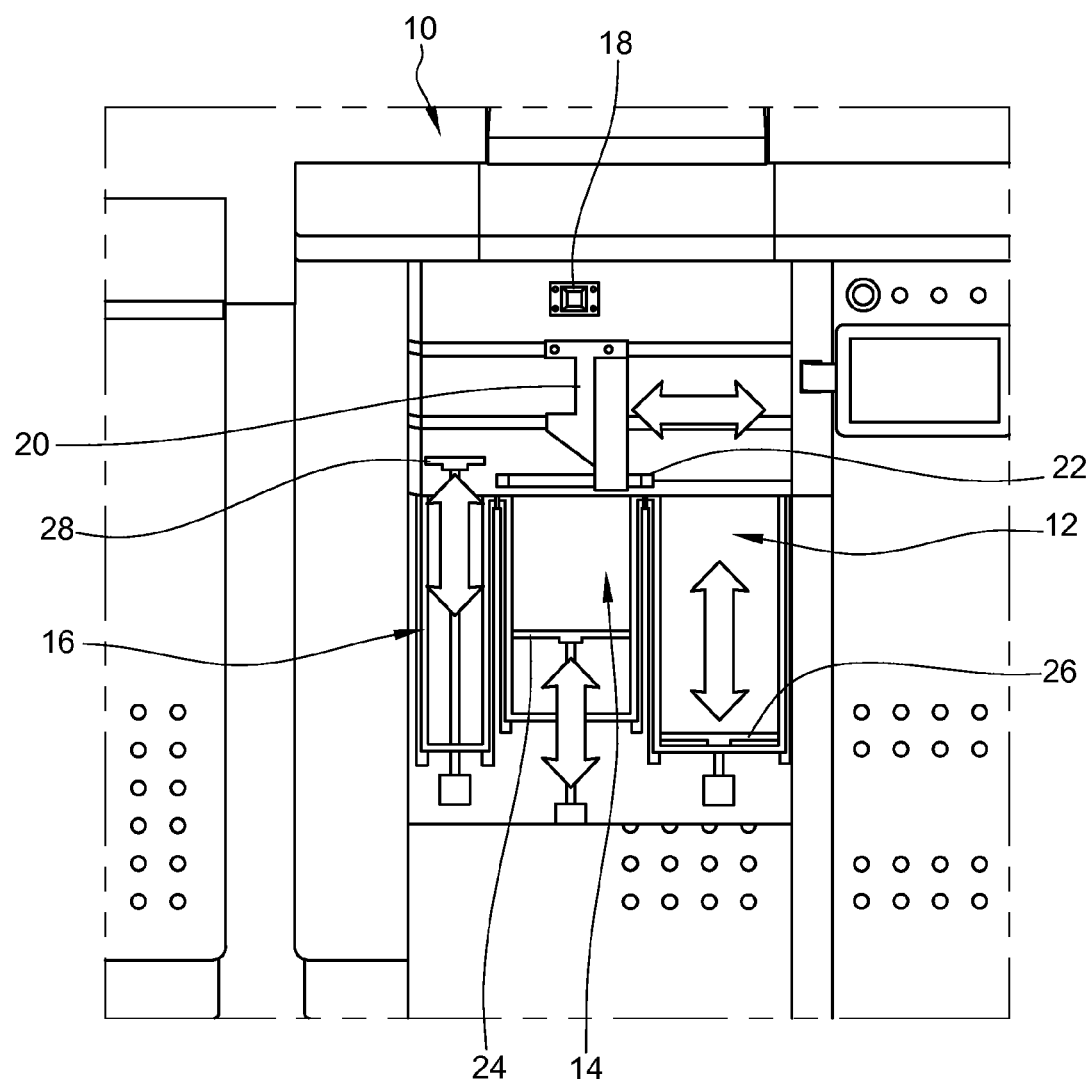
FIG. 2 is a schematic cross-sectional view of a laser melting additive manufacturing machine.
Figure 3:
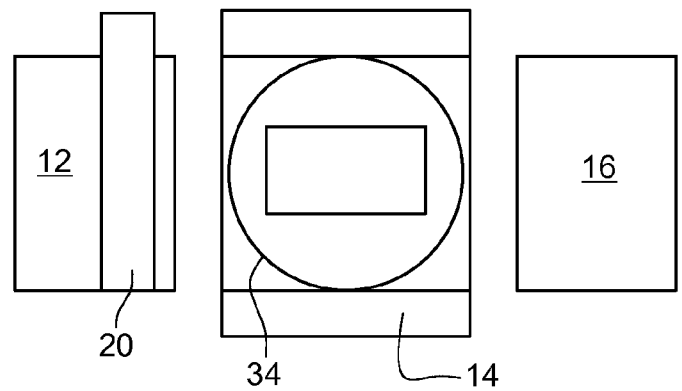
FIG. 3 is a schematic cross-sectional view of a laser melting additive manufacturing equipment according to the prior art.

The equipment 10 further comprises a movable scraper 20 and an argon projection system 22 as shown in FIG. 2.

More specifically, each container 12, 14, 16 comprises four walls extending along the longitudinal axis X. In each container 12, 14, 16, the four walls encircle a movable platform 24, 26, 28 forming the bottom of each container. Each movable platform 24, 26, 28 is mobile along the longitudinal axis X. The delta of movement of each platform 24, 26, 28 is equal to or greater than the height of the part being manufactured. Each container 12, 14, 16 has a free, open end opposite the bottom.

The movable scraper 20 is a plate circulating along a third transverse plane located at the free surface of the three containers 12, 14, 16. This third transverse plane is located on the longitudinal axis X between the laser head 18 and the second plane, in direct contact with the three powder beds of the three containers 12, 14, 16.

To manufacture a part, powder is placed in the first container 12. The movable scraper 20, positioned at the external end of the first container 12, passes over the first container 12 and thus spreads a layer of powder on the platform of the second container 14, and, if any powder remains, a layer in the third container 16. We thus have the three powder beds with a free surface substantially perpendicular to the longitudinal axis X. Each platform 24, 26, 28 is thus intended to receive a thickness of powder whose free surface defines, for each container 12, 15, 16, its powder bed.

The equipment 10 further comprises two movable shields 30, 32. These shields 30, 32 comprise a plate structure and are activated by the electronic control system of the equipment 10. According to one possible embodiment, the two movable shields 30, 32 are mechanically linked to the scraper 20, which is also set in motion by the electronic control system of the equipment 10. This plate has a depth as measured along an axis perpendicular to the axis X and parallel to the second plane identical to that of the container 14 and a height, along the axis X, at least equal to that of the gas flow grids of the projection system 22. They circulate transversely to the surface of the three containers 12, 14, 16, in the same transverse plane as the movable scraper 20.

When the laser head 18 is activated, a laser beam L is emitted and impacts the powder bed in the second container 14. This impact area 34 forms a melting area for the powder.

More precisely, the total melting area of the laser L merges with the surface of the container 14. The melting surface area of the circle formed by the impact area 34 is defined as the surface area over which the gas flow is laminar without turbulence. The area outside the circle of the impact area 34 is the area where the many turbulences are generated that we are talking about protecting here.

In parallel to this laser emission, the argon (Ar) projection system emits a laminar flow of argon (Ar) towards the impact area 34. This allows to protect the melting in a such a way as to:
  remove the powder particles from the first and third containers 12, 14 that may redeposit on the freshly melted portion of the powder bed, and
  to plate the powder from the powder bed at the time of melting.

The phase during which the laser head 18 is activated is referred to the melting phase. The phase during which the laser head 18 is switched off and the powder bed in the second container 14 is renewed is referred to as the reloading phase. During the melting phase, the movable shields 30, 32 and the movable scraper 20 are in a melting position and during the reloading phase, the movable shields 30, 32 and the movable scraper 20 are in a reloading position.

The melting position of the movable shields 30, 32 is a position in which the first shield 30 is located between the internal transverse end 12a of the first container 12 and the centre of the second container 14 and the second shield 32 is located between the centre of the second container 14 and the internal transverse end of the third container 16. In the melting position, representing a first position of the movable shields 30, 32, the first shield 30 is located between the first container 12 and the second container 14. The reloading position of the shields 30, 32 is a position in which both shields 30, 32 are located at a transverse end of the set of the three containers 12, 13, 14.

In the present case, they are located at the transverse end of the third container 16 and more particularly an external transverse end 16b of the third container 16 opposite the internal transverse end 16a of the third container 16. The reloading position represents a second position of the movable shields 30, 32. The movable shields move between the first and the second position.

Specifically, in one particular embodiment, the two shields 30, 32, may, in their melting position, lie transversely directly on either side of the impact area 34.

The melting position of the movable scraper 20 is a position in which the movable scraper 20 is located at the internal transverse end 12a of the first container 12. In the melting position, the movable scraper 20 surmounts the first container 12. The reloading position of the movable scraper 20 is a position in which the movable scraper 20 is with both shields 30, 32, at the external transverse end 16b of the third container 16.

The internal transverse end 12a of the first container is the transverse end of the first container 12 closest to the centre of the second container 14. Similarly, the internal transverse end 16a of the third container 16 is the transverse end of the third container 16 closest to the centre of the second container 14. It is opposite the external transverse end 16b of the third container 16 furthest from the centre of the second container 14.

During the melting phase, the laser beam L moves in a transverse plane. The impact area 34 is therefore mobile in a transverse plane, substantially perpendicular to the longitudinal axis X. This transverse axis merges with the second transverse plane in which the powder beds of the three containers 12, 14, 16 lie. The melting position of the first and second shields 30, 32 may be a movable position; indeed, in an embodiment where the shields 30, 32 are positioned directly on either side of the impact area 34, if the latter moves, the shields 30, 32 move with it.

The laser head 18 is movable, and the first and second shields 30, 32 move in correlation with the laser head 18. This embodiment allows the shields to always delineate the impact area 34 during the melting phase.

Such a configuration thus consists in setting up movable shields 30, 32 as close as possible to the impact area 34.

More particularly, the shields 30, 32 are installed on the one hand transversely on the same side of the scraper 20, so that the latter can move transversely without steric hindrance.

The shields 30, 32 can thus move to be as close as possible to the melting area without hindering the movement of the scraper 20.

After each melting phase, the laser head 18 is switched off. The platforms 26, 28 are moved one step longitudinally away from the laser head while the platform 24 is moved longitudinally closer to the laser head 18, and the shields 30, 32 and the movable scraper 20 move to the reloading position.

The movement of the movable scraper 20 allows the powder bed in the second container 14 to be replenished by driving a layer of powder from the first container 12 into the second container 14 and driving the surplus into the third container 16.

At the end of the reloading phase, both shields 30, 32 and the movable scraper 20 return to their melting position. The laser head 18 is switched on again.

Figure 4:
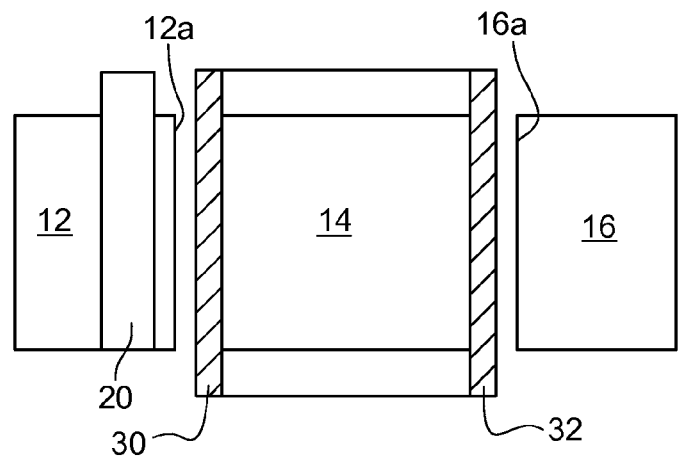
FIG. 4 is a schematic cross-sectional view of the equipment according to the disclosure in the melting position.
Figure 5:
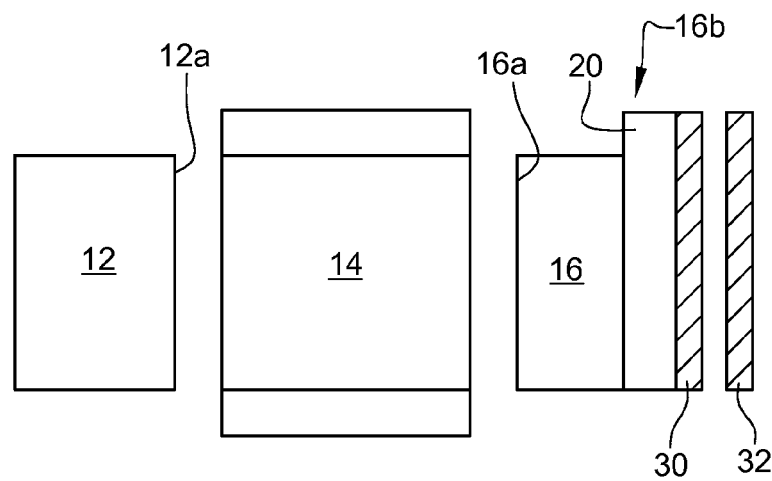
FIG. 5 is a schematic cross-sectional view of the equipment according to the disclosure in the reloading position.

Thus, the equipment 10 allows the manufacture of a part by a succession of melting phases and reloading phases:
  during each melting phase, the laser head 18 is activated and impacts the powder bed of the second container 14 creating an impact area in which the powder is melted;
  during each reloading phase successively:
    the platforms 24, 26, 28 of the containers 12, 14, 16 move one step along the longitudinal axis X away from or toward the laser head 18,
    the shields 30, 32 move from their melting position to their reloading position (FIG. 5),
    the movable scraper 20 moves from its melting position to its reloading position so as to wipe the non-melted powder from the powder bed of the second container 14 and returns to its melting position (FIG. 4),
    the first and second shields 30, 32 return to their melting position (FIG. 4).

All of these movements can also be done simultaneously: the shields 30, 32 and the movable scraper 20 move together and at the same time from their respective reloading positions (FIG. 5) to their respective melting positions (FIG. 4).

A filling phase of the containers 12, 14, 16 precedes the cycle of successive melting and reloading phases, and a removing phase of the manufactured part follows the cycle of successive melting and reloading phases.

The invention claimed is:

1. A laser melting additive manufacturing equipment, comprising:
   a laser head configured to emit a laser beam defining a longitudinal axis (X), the laser head being movable;
   a first container, a second container, and a third container respectively aligned in a first transverse plane substantially perpendicular to the longitudinal axis (X), the second container being located between the first container and the third container, the first, second, and third containers each comprising a movable platform that can move along the longitudinal axis (X), each platform being configured to receive a thickness of powder, wherein free ends of the platforms respectively define three powder beds aligned in a second transverse plane;
   a movable scraper;
   an electronic control system configured to move the movable scraper in a third transverse plane which is transverse with respect to the platforms of the first, second, and third containers so as to be in contact with each of the powder beds;
   a first movable shield and a second movable shield, wherein the electronic control system is configured to move the first and second movable shields in the third transverse plane between:
      a melting position in which the first shield is located between the first container and the second container and in which the second shield is located between the second container and the third container, and
      a reloading position in which the first and second shields are located at a transverse end of the third container;
   an inert gas projection system comprising at least one gas flow grid, wherein the first and second shields each comprise a movable wall having a depth as measured along an axis perpendicular to the longitudinal axis (X) and parallel to the second plane, at least equal to that of the second container and a height along the axis (X) at least equal to that of the at least one gas flow grid,
   wherein the electronic control system is configured to move the first and second shields in correlation with the movement of the laser head.

2. The laser melting additive manufacturing equipment according to claim 1, wherein the first container is a powder supply, the second container is a laser melting tank, and the third container is a powder surplus container.

3. The laser melting additive manufacturing equipment according to claim 1, wherein in the melting position, the movable scraper surmounts the first container, and in the reloading position, the movable scraper is located at the transverse end of the first, second, and third containers.

4. The laser melting additive manufacturing equipment according to claim 1, wherein the laser beam is configured to be emitted in a direction of the powder bed of the second container so as to create an impact area for the laser beam on said powder bed, the first and second shields being located, in melting position, transversely on either side of the impact area.

5. A laser melting additive manufacturing method implemented by the laser melting additive manufacturing equipment according to claim 1, the method comprising: manufacturing a part by a succession of melting phases and reloading phases:
   wherein during each melting phase, the laser head is activated and the laser beam impacts the powder bed of the second container creating an impact area in which the powder is melted, the inert gas being projected during the melting phase;
   wherein during each reloading phase, the movable platform of each of the first, second, and third containers move along the longitudinal axis (X) away from or towards the laser head, the electronic control system moving the first and second movable shields from the respective melting positions to the respective reloading positions, and the movable scraper moves from the melting position to the reloading position so as to wipe any non-melted powder from the powder bed of the second container and then returns to the melting position, and the first and second shields return to the respective melting positions,
   wherein the electronic control system moves the first and second movable shields in correlation with the movement of the laser head.

6. The method according to claim 5, wherein a phase of filling the first container precedes the cycle of successive melting and reloading phases, and a phase of removing the part follows the succession of successive melting phases and reloading phases.

* * * * *